United States Patent
Weerawarana et al.

(10) Patent No.: US 6,536,033 B1
(45) Date of Patent: Mar. 18, 2003

(54) UNIFORM MECHANISM FOR BUILDING CONTAINMENT HIERARCHIES

(75) Inventors: Sanjiva Weerawarana, Yorktown Heights, NY (US); David A. Epstein, Ossining, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/238,430

(22) Filed: Jan. 28, 1999

(51) Int. Cl.⁷ .................................................. G06F 9/45
(52) U.S. Cl. ............................................... 717/2; 717/1
(58) Field of Search .......................... 717/2, 1; 345/340, 345/473; 707/6

(56) References Cited

U.S. PATENT DOCUMENTS

| | | | | |
|---|---|---|---|---|
| 5,206,951 A | * | 4/1993 | Khoyi et al. | 709/315 |
| 5,544,302 A | * | 8/1996 | Nguyen | 395/326 |
| 5,581,686 A | * | 12/1996 | Koppolu et al. | 345/340 |
| 5,625,818 A | * | 4/1997 | Zarmer et al. | 707/104 |
| 5,787,425 A | * | 7/1998 | Bigus | 707/6 |
| 5,880,743 A | * | 3/1999 | Moran et al. | 345/473 |
| 5,905,884 A | * | 5/1999 | Williams | 395/500.44 |
| 5,987,247 A | * | 11/1999 | Lau | 717/2 |
| 5,999,179 A | * | 12/1999 | Kekic et al. | 345/349 |
| 6,044,218 A | * | 3/2000 | Faustini | 717/2 |
| 6,167,406 A | * | 12/2000 | Hoskins et al. | 707/102 |

OTHER PUBLICATIONS

AN: 1998:247632 NLDB, Title: Component Imperatives, or beans with everything, source: Software Futures, (Nov. 1, 1997) vol. 7, No. 1. ISSN: 0965–6545., Pub: ComputerWire, In.*

AN: 97:449964, Document No.: 2545422, Title: International Business Machines—Company Report Author: Chopra, A.Corp. Source: Credit.*

* cited by examiner

*Primary Examiner*—Mark R. Powell
*Assistant Examiner*—Chameli C. Das
(74) *Attorney, Agent, or Firm*—McGuireWoods, LLP; Stephen C. Kaufman

(57) ABSTRACT

A uniform mechanism for building containment hierarchies separates the code/method which actually perform the containment insertion operations on the components from the specification of the containment and then provides an automatic way of obtaining and executing that code when containment hierarchies need to be created. The mechanism consists of an abstract syntax for describing the containment relationships, processing mechanism for creating the containment mechanism, and a registry containing the mechanisms for implementing specific containment policies. Having this abstraction allows an application programmer to be able to construct hierarchies of objects without having to be concerned about the specific details of how that containment is performed. In fact, the details may be deferred until run-time (and even downloaded from elsewhere). Also, having this abstraction significantly simplifies automatic generation of object hierarchy codes, both from the point of view its implementation as well as that of the code that is generated.

4 Claims, 3 Drawing Sheets

UNIFORM MECHANISM FOR BUILDING CONTAINMENT HIERARCHIES

BACKGROUND OF THE INVENTION

1. Field of the Invention

The present invention generally relates to Computer Aided Software Engineering (CASE) and, more particularly, to a uniform mechanism for building containment hierarchies.

2. Background Description

Object oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs. The most widely used object based and object oriented programming languages trace their heritage to Simula developed in the 1960s by O-J. Dahl, B. Myhrhaug and K. Nygard of Norway. Further information on the subject of OOP may be had by reference to Object Oriented Design with Applications by Grady Booch, The Benjamin/Cummings Publishing Co., Inc., Redwood City, Calif. (1991).

Rapid Application Design (RAD) tools, such as Microsoft's Visual Basic, offer a way to produce a software application in a relatively short period of time. Typically, RAD tools are used to generate the "look and feel" of an application, but the code generated by these tools are generally slow in execution. Therefore, many software houses prototype the Graphic User Interface (GUI) of their applications in a RAD tool and then implement the application in C++.

Despite the benefits of object-oriented program development, implementing large applications in, for example, C++ can be expensive. One approach to reducing the cost is to reuse object implementations. Object Oriented Programming (OOP) languages provide some degree of reuse. OOP is about describing how objects interact with one another. Component Object Programming (COP) is designed to produce reusable units of software. COP use building blocks for constructing custom software. Unlike OOP objects, COP hides details above the object-interaction level. There is no inheritance between components, although the objects that make up the component may inherit behavior from other objects, possibly in other components. In other words, when using a component, the inner workings of that component are oblivious to the application using the component. The component always appears as a single interface which formalizes properties, events and behavior. As a result of its well defined interface, a component may be easily reused. Components are to software what integrated circuits (ICs) are to electronics; they encapsulate function and provide services based on a strict specification of their interface. For example, a spell-check component encapsulates the minimum knowledge to completely perform its task. Thus, by combining components, large software applications can be built.

An advantage of COP is an additional level of modularity on top of what OOP already offers. Instead of thinking about how any one given object interacts with another object, the focus is on how entire sets of functionalities interact. OOP does not encapsulate groups of classes and objects. COP hides the information at the class level. Sun Microsystems' JavaBeans is a component architecture for the cross-platform Java programming language.

Creating hierarchical containment structures is a common programming operation. For example, components are placed inside a Java object called a container. A dialog box in Java is made up of the surrounding container and the components within it needed to make the dialog box useable, such as a text field and at least one button. In current technology, the mechanisms used to create hierarchies are very much tied to the specific object types which are being composed and the operations they support. Unfortunately, this approach does not lend itself to a generalized view of containment and consequently to a generalized implementation of containment that can support arbitrary object types.

To illustrate this point, consider how user interfaces use containment for layout management. Windows may contain panels which, in turn, have other panels, buttons, text fields, etc. whose containment hierarchy defines the visual layout. Other natural examples are:

the members of a set are contained in the set, the keys and values in a hash table are contained in the hash table, the elements of a vector are contained in the vector, and hierarchical data structures such as trees where child nodes are contained in parent nodes.

In each of these examples, the mechanism of how the containment creation is requested is different. For example, Certain Java AWT components use the form:

parent.add (child)

Certain Java swing components use the form:

parent.getContentPane( ). add(child)

Java swing Tab components use the form:

parent.addTab(child, . . . )

Java Hashtables use the form:

table.put(key,value)

Java Vectors use the form:

vector.addElement(element)

Java Stacks use the form:

parent.pushChild(child)

XMLs DOM uses the form:

parent.appendChild(child)

Today, the details of how to actually add a containee to a container is encapsulated within each of these mechanisms.

SUMMARY OF THE INVENTION

It is therefore an object of the present invention to unify how containment is requested as well as a syntax which insulates the user from having to know how each type of component implements its containment creation request.

According to the invention, there is provided a uniform mechanism for building containment hierarchies by separating the code/method which actually perform the containment insertion operations on the components from the specification of the containment and then by providing an automatic way of obtaining and executing that code when containment hierarchies need to be created. The invention consists of

- an abstract syntax for describing the containment relationships,
- a processing mechanism for creating the containment mechanism, and
- a registry containing the mechanisms for implementing specific containment policies.

Having this abstraction allows an application programmer to be able to construct hierarchies of objects without having to be concerned about the specific details of how that containment is performed. In fact, the details may be deferred until run-time (and even downloaded from elsewhere on the network). Also, having this abstraction significantly simplifies automatic generation of object hierarchy codes, both from the point of view its implementation as well as that of the code that is generated.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The detailed description is provided in terms of an implementation in the Java programming language. The description uses the following terms:

Container: the object into which other objects are to be added.

Containee: the object which is being added to a container.

Parent: synonym for container.

Child: synonym for containee.

The process of adding a containee into a container is referred to as "adding". The invention allows one to add a containee into a container without being aware of the details of the mechanics of implementing the adding operation.

The invention introduces the concepts of an "Adder" and an "Adder Registry". An adder is an object that understands the mechanics of how to add a containee to a specific type of container. In the Java realization, an Adder is defined by the following interface:
public interface Adder{
    public void add (Class parentclass, Object parent, Object[] args);
}

Thus, an adder is a Java object that implements this interface by providing the add ( ) method defined above. As an example, an adder for Java AWT containers is shown below:

```
public class AwTContainerAdder implements Adder{
    public void add (Class parentClass, Object parent, Object[] args{
        Container c = (Container) parent;
        if (args.length == 2){
            c.add ((Component) args[0], args[1]);
        }else{
            c.add ((Component) args[0]);
        }
    }
}
```

The adder registry is a registry of adders. The registry is used to register adders that are capable of adding to specific container types and to find an adder for given container type. The registration and looking up of adders from the registry uses the type of the container as a key. This allows the registry to try to find a suitable adder even when an adder is not available directly.

Figure 1:
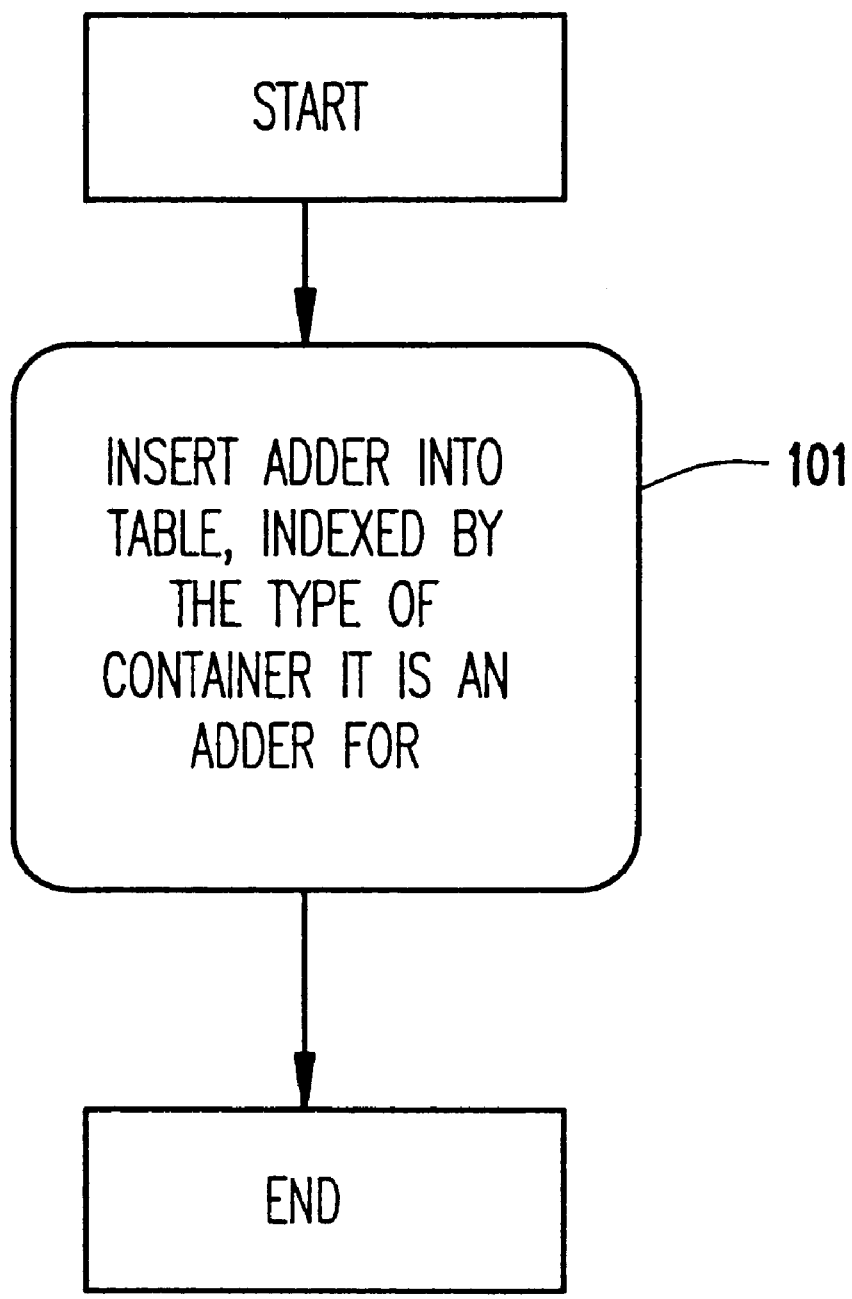
FIG. 1 is a flow diagram of the process of registering an adder in the adder registry.

The process of registering an adder is illustrated in FIG. 1. In function block 101, the adder object is associated with the container type it purports to be capable of adding to. This association is remembered by the registry for use when a look up is requested.

Figure 2:
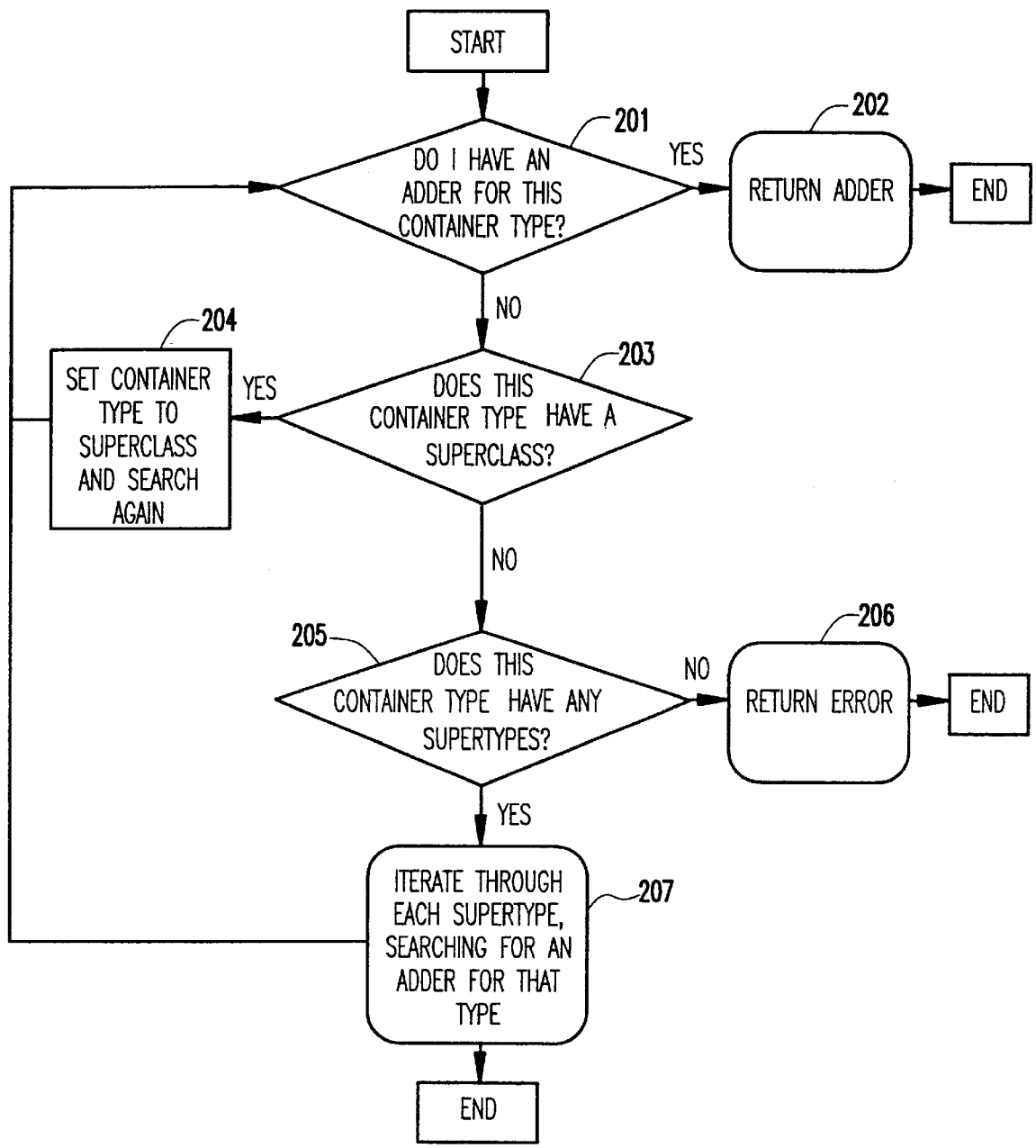
FIG. 2 is a flow diagram of the process of looking up an adder in the adder registry.

The process of looking up an adder from the adder registry is illustrated in FIG. 2. In decision block 201, a test is made to determine if an adder for the given container type is available in the registry. If yes, that adder is returned in function block 202. If not, a test is made in decision block 203 to determine if the container type has a superclass. If so, function block makes a recursive call to the registry to look up an adder for the superclass type. If not, in decision block 205, a test is made to determine whether the container type has any supertypes. If not, in function block 206 an error status is returned. If so, in function block 207, recursive calls are made iteratively to the registry to look up an adder for the nth super type of the container's type. Function and decision blocks 205 and 207 effectively implement a depth-first traversal of the type lattice looking for a suitable adder.

Figure 3:
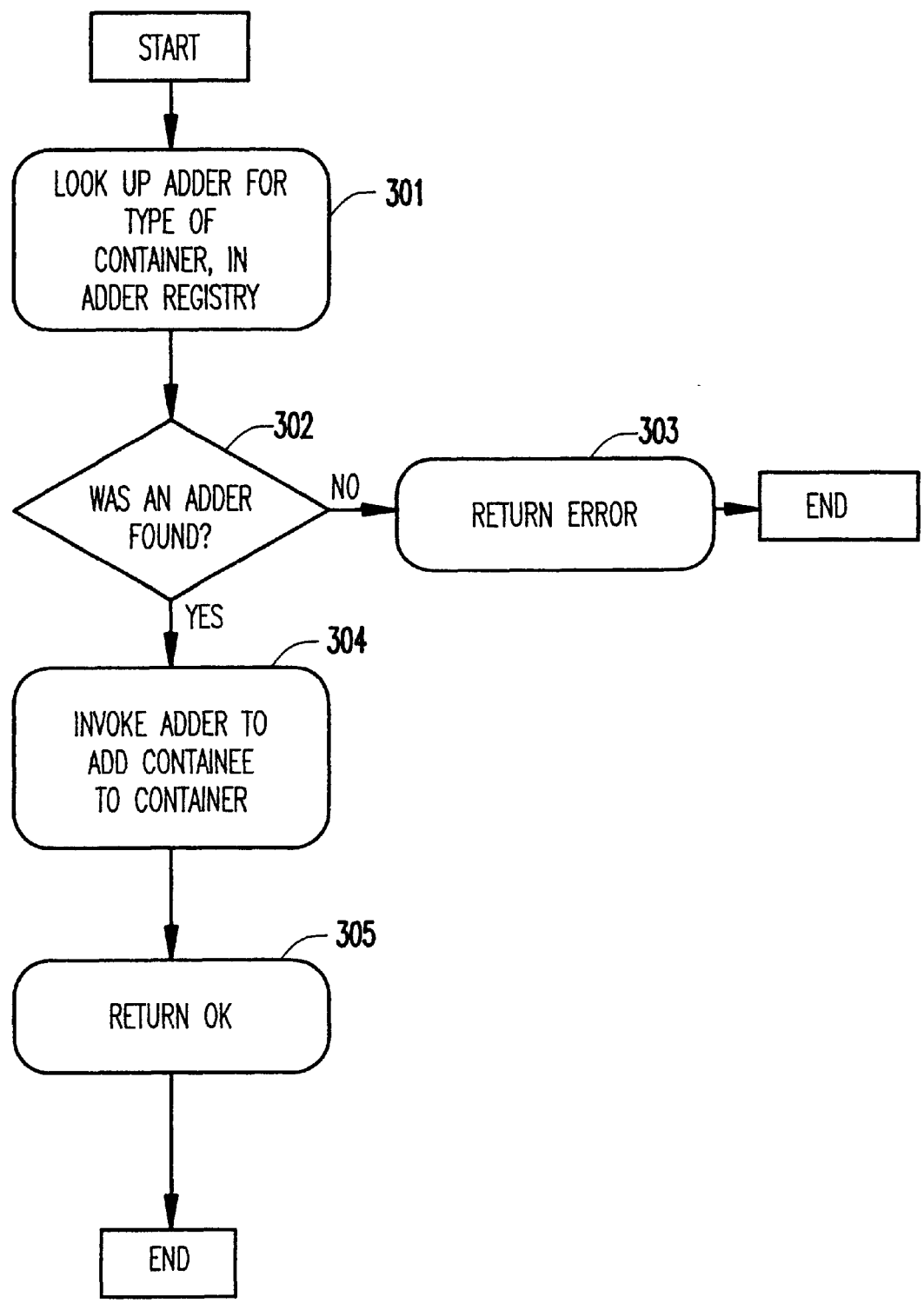
FIG. 3 is a flow diagram of the process implementing the add () service method that uses the adder registry to implement the adding of an object to its containing object.

Adding a containee to a container is a service provided by a utility object. This service (method) takes the container and one or more additional arguments consisting of the containee and any supplemental information (such as constraints to guide the adding) and performs the addition. The function of this service method is illustrated in FIG. 3. In function block 301, the registry of adders is consulted to find the appropriate adder based on the type of container. In decision block 302, a test is made to determine whether an adder was found. If not, in function block 303, an error status is returned to indicate that the service method was unable to perform the add. If yes, function block 304 invokes the adder to actually perform the add, and in function block 305 a satisfactory return status is returned to the caller.

By using the adder, adder registry and the service method, one can create a higher abstraction of the common programming tasks of adding objects to other objects to form hierarchies.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method implemented on a computer for building containment hierarchies manually and through automatic code generation, comprising the steps of:

registering adders in an adder registry that is used to register said adders, wherein said adders are objects that are associated with container objects that represent other objects and whose task is to add a containee object that represents an object to a specific said container object that represents another object wherein said adder registry is used to register adders that are capable of adding to specific container types and to find an adder for given container type and wherein the registration and looking up of adders from the registry uses the type of the container as a key;

examining said adder registry to determine whether it contains an adder for a particular said container object; and invoking said adder to add said containee object to said container object.

2. A method according to claim 1 that registers and looks up said adders from said adder registry by utilizing an object type associated with each said container object as a key.

3. A method according to claim 1 that allows said containee object to be added to a said container object without requiring an application programmer to have knowledge of how said adder function is performed, thereby providing a level of abstraction that simplifies the generation of object hierarchy codes.

4. A method according to claim 1 that determines whether a first container has a superclass, and adds said containee object to said superclass object of said first container object when there is no said adder associated with said first container object.

* * * * *